United States Patent
West et al.

[11] Patent Number: 5,777,270
[45] Date of Patent: *Jul. 7, 1998

[54] DEVICE FOR CHANGING THE RUN DIRECTION OF A PRE-BUSSED RIGID CONDUIT ELECTRICAL DISTRIBUTION SYSTEM

[76] Inventors: Rodney Joe West, 309 East Vine St., Liberty, Ind. 47353; Robert I. Whitney, 16170 St. Mary's Rd., Brookville, Ind. 47012; Glenn S. O'Nan, 788 Franklin St., Hamilton, Ohio 45013

[*] Notice: The term of this patent shall not extend beyond the expiration date of Pat. No. 5,723,820.

[21] Appl. No.: 147,611

[22] Filed: Nov. 5, 1993

[51] Int. Cl.[6] .................................................. H01R 4/60
[52] U.S. Cl. ............... 174/99 B; 174/72 C; 174/88 R; 174/99 R; 439/207; 439/208; 439/210
[58] Field of Search ................... 174/75 R, 76, 174/81, 74 A, 84 R, 91, 68.1, 68.2, 72 R, 92, 88 R, 135, 71 R, 72 A, 72 C, 88 B, 89, 79, 21 R; 439/110, 115, 119, 207, 208, 210, 276

[56] References Cited

U.S. PATENT DOCUMENTS

| 325,984 | 9/1885 | Smith | 174/88 R |
|---|---|---|---|
| 1,992,574 | 2/1935 | Jenkins | 174/72 C |
| 4,744,629 | 5/1988 | Bertaglio et al. | 174/92 X |

FOREIGN PATENT DOCUMENTS

| 1063517 | 5/1954 | France | 174/92 |
|---|---|---|---|
| 3823598 | 1/1990 | Germany | 174/135 |
| 0011842 | of 1894 | United Kingdom | 174/71 |
| 2205200 | 11/1988 | United Kingdom | 174/72 C |

*Primary Examiner*—Hyung S. Sough
*Attorney, Agent, or Firm*—Larry I. Golden; David R. Stacey; Larry T. Shrout

[57] ABSTRACT

An elbow for changing the run direction of a pre-bussed rigid conduit electrical distribution system. The elbow has a number of individually insulated electrical conductors each of which is formed to a predetermined angle. The conductors are enclosed within a hollow housing which is formed to the same predetermined angle such that it will enclose the electrical conductors. A uniform and continuous support is provided for that portion of each electrical conductor which is enclosed within the housing.

12 Claims, 6 Drawing Sheets

5,777,270

DEVICE FOR CHANGING THE RUN DIRECTION OF A PRE-BUSSED RIGID CONDUIT ELECTRICAL DISTRIBUTION SYSTEM

FIELD OF THE INVENTION

Electrical distribution feeder systems for use in industrial and commercial locations.

BACKGROUND OF THE INVENTION

Industrial and commercial electrical distribution feeder systems are generally one of three types: cable and conduit, cable and cable tray, or electrical busway. Straight runs of any one of these three systems are relatively easy to install. However, when a change of run direction is required the installation time and cost increases significantly. Pulling cable through an elbow is very difficult and time consuming, especially when multiple cables must be pulled in a single conduit. In most cable tray installations the cable tray is supported by drop rods suspended from roof supports or I-beams. When the electrician installs cable, these drop rods are obstacles which prevent him from easily "laying in" the cable. A change in the cable tray run direction generally requires additional supports and therefore additional drop rods which the electrician must maneuver the cable around. Busway installations are generally simpler than conduit and cable or cable tray and cable since the conductors are already inside a protective enclosure, therefore no additional labor is required for wiring after the busway is installed. Busway, however, is a manufactured product and therefore generally has a higher cost per foot than equivalent cable and conduit or cable and cable tray. The higher cost per device may somewhat offset the lower installation cost. Busway is most cost effective in higher amperages where large or multiple cables must be used. Therefore it would be desirable to have a distribution system which is generally comparable in cost to the component prices of conduit and cable and have easily installed component sections like busway.

SUMMARY OF THE INVENTION

The present invention provides a relatively low cost and easily installed means by which the run direction of pre-bussed rigid conduit electrical feeder system of the type disclosed in U.S. patent application Ser. No. 07/912,071 and U.S. patent application Ser. No. 08/085,341 and hereby incorporated by reference may be altered. The invention provides an elbow for making the run direction change. The elbow has a number of individually insulated electrical conductors enclosed within a housing, all of which are preformed to a predetermined angle such as 22½°, 45° or 90° or any other angle less than 180°. The housing is designed such that the pre-formed insulated conductors may be easily received therein. An expandable foam is introduced into the housing after assembly for the purpose of providing continuous support to the conductors over the entire length of the housing. The ends of each conductor extend outwardly past the associated ends of the housing. A portion of the electrical insulation is removed from the extending ends of each electrical conductor of the elbow thereby providing an electrical contact surface for electrically connecting to the electrical conductors of adjacent straight sections or elbows of pre-bussed conduit.

Other features and advantages of the invention will become apparent to those skilled in the art upon review of the following detailed description, claims and drawings.

Figure 1:
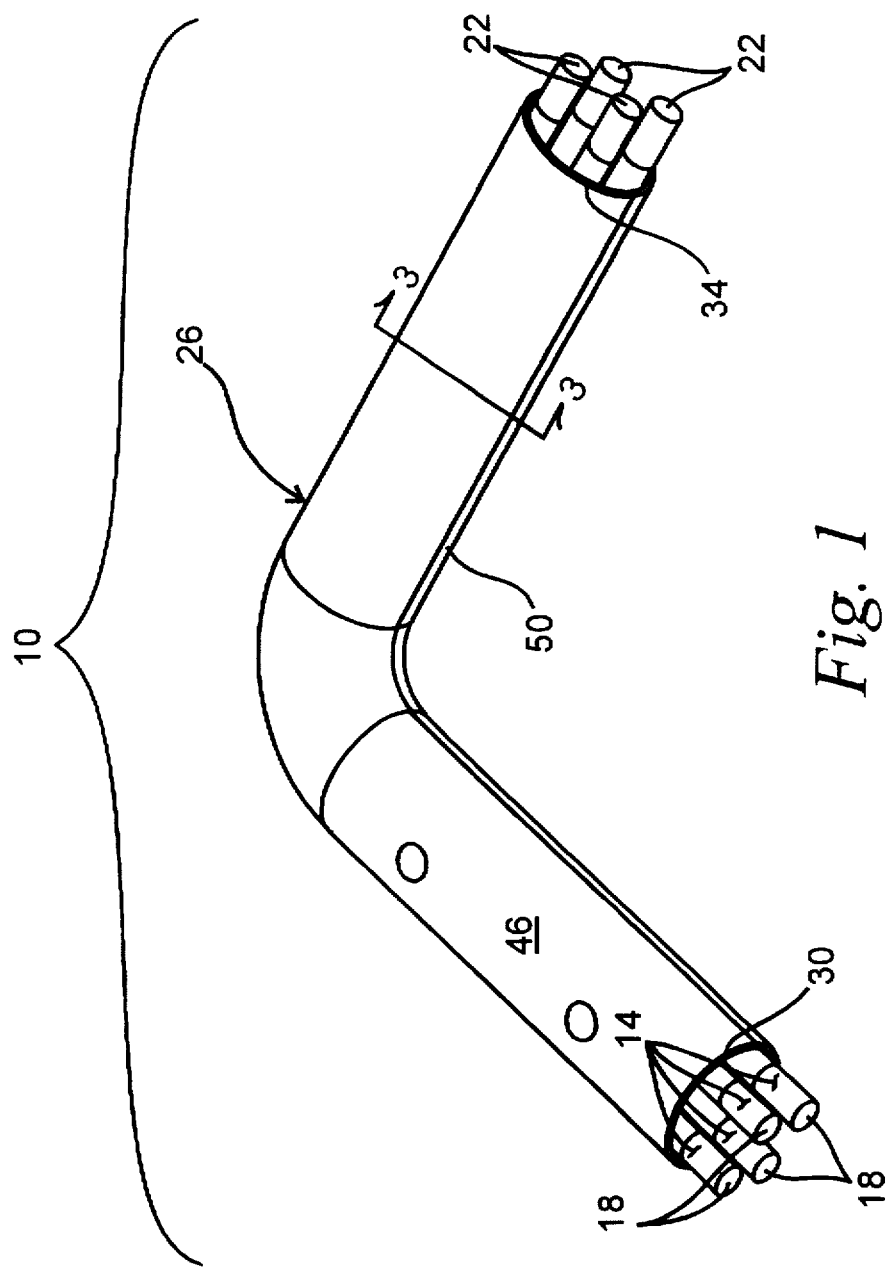
FIG. 1, is an isometric view of a pre-bussed conduit elbow of the present invention.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

FIG. 1 illustrates an elbow of the present invention generally indicated by the reference numeral 10. The elbow 10 includes a number of electrical conductors 14 each having a first end 18 and a second end 22. Each conductor 14 is formed such that a predetermined angle of 22½°, 45° or 90° is maintained between the first and second ends, 18 and 22 respectively. The electrical conductors 14 are enclosed within a housing 26. The housing 26 has a first end 30 and a second end 34 and is formed such that the angle between the first and second ends, 30 and 34 respectively, is the same as the predetermined angle of the conductors 14 which it encloses. The housing 26 provides support and protection for the enclosed conductors 14 and may also be used as the system ground conductor. The first ends 18 of each conductor 14 extend outwardly an equal length from the first end 30 of the housing 26. The second ends 22 of each conductor 14 extend outwardly an equal length from the second end 34 of the housing 26.

Figure 2:
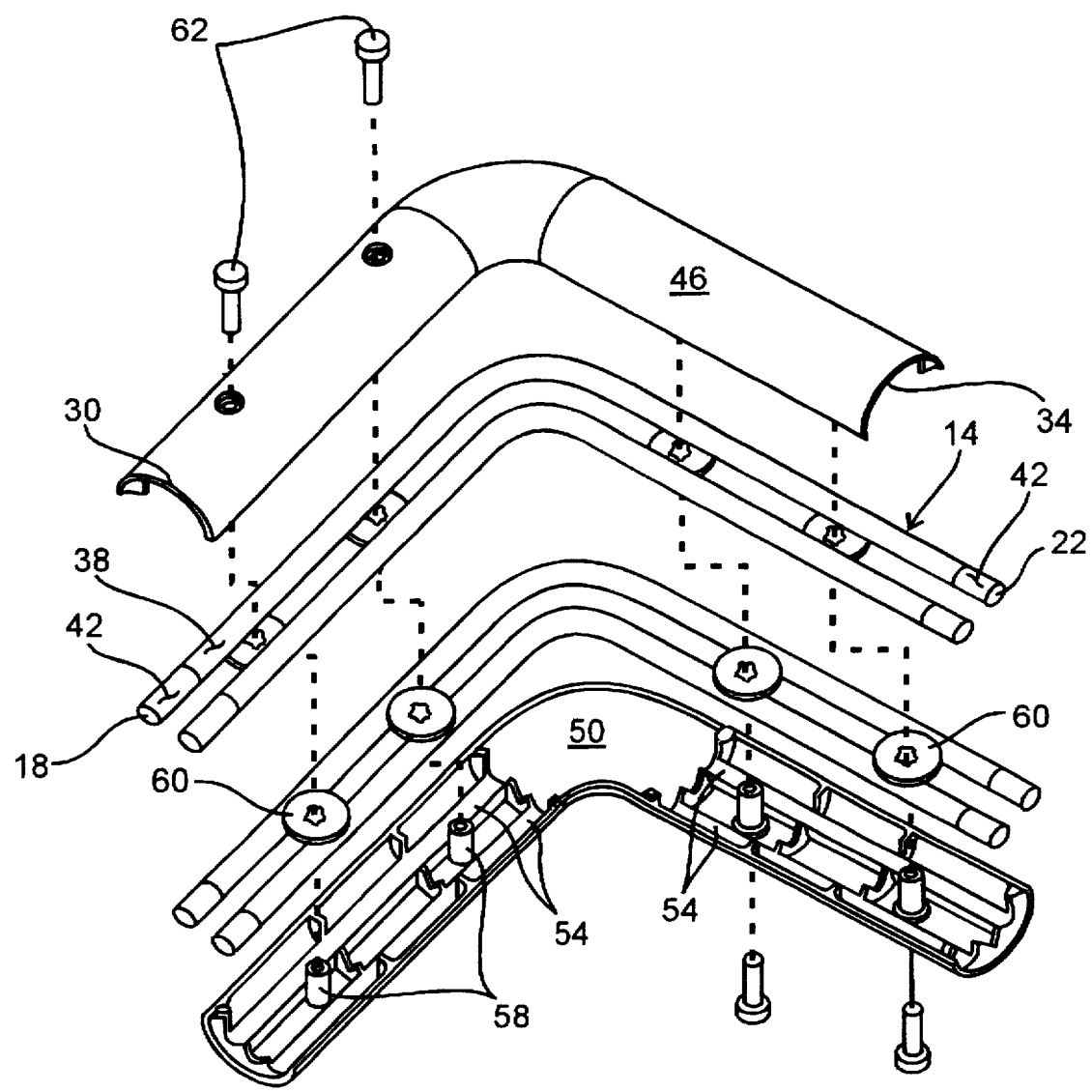
FIG. 2 is an exploded view of a pre-bussed conduit elbow of the present invention.
Figure 3:
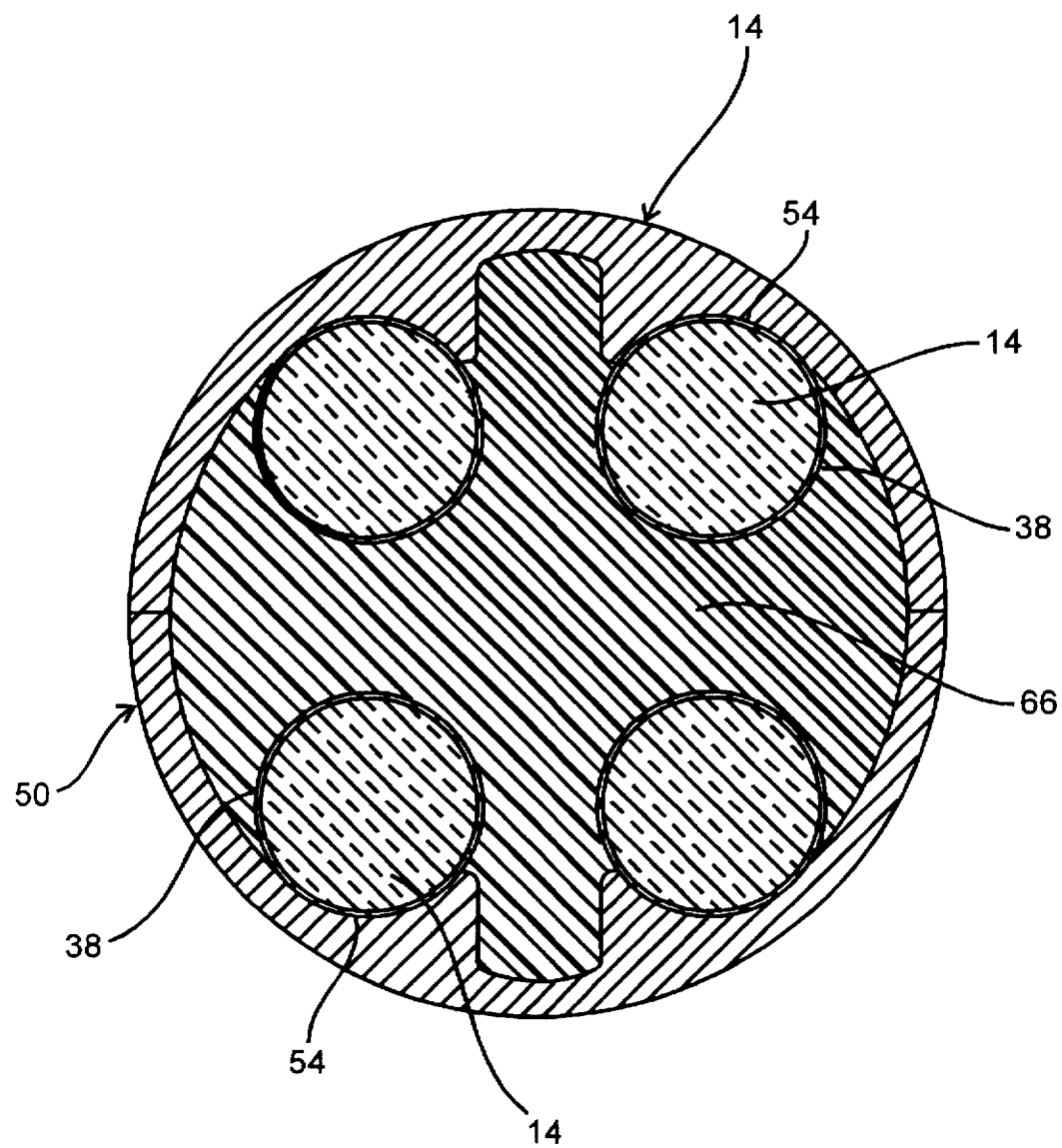
FIG. 3 is a cross-sectional view taken along lines 3—3 of FIG. 1.

Referring now to FIG. 2, it can be seen that each conductor 14 is covered by an electrically insulating sheath 38. A portion of the sheath 38 is removed from each of the first and second ends, 18 and 22 respectively, of each conductor 14 thereby providing an electrical contact surface 42. The housing 26 is made from a first half 46 and a second half 50. Each of the halves 46 and 50 are generally semi-circular in cross-sectional shape and include a number of integrally formed conductor supports 54. A number of towers 58, each integrally formed from a portion of each of the halves 46 and 50 provide a means for securing the conductors 14 in the housing 26 during assembly. One or more conductors 14 are placed in each of the halves 46 and 50 such that they rest on the supports 54 and are immediately adjacent to the towers 58. Commercially available retaining washers 60 are pushed down on the towers 58 to captivate the adjacent conductors 14 in the housing half during assembly. The towers 58 also provide a place where suitable fastening means such as screws 62 or rivets may be inserted for securely fastening the two halves 46 and 50 together Referring now to FIG. 3, it can be seen in this cross-sectional view that the conductors 14 are supported by an expandable foam material 66 such as a polyurethane foam. The foam material 66, in liquid form, is inserted into the void defined by the two housing halves 46 and 50 after the housing 26 is assembled around the conductors 14. The foam material 66 expands to completely fill the void and thereby provides a continuous support for the conductors 14.

Figure 4:
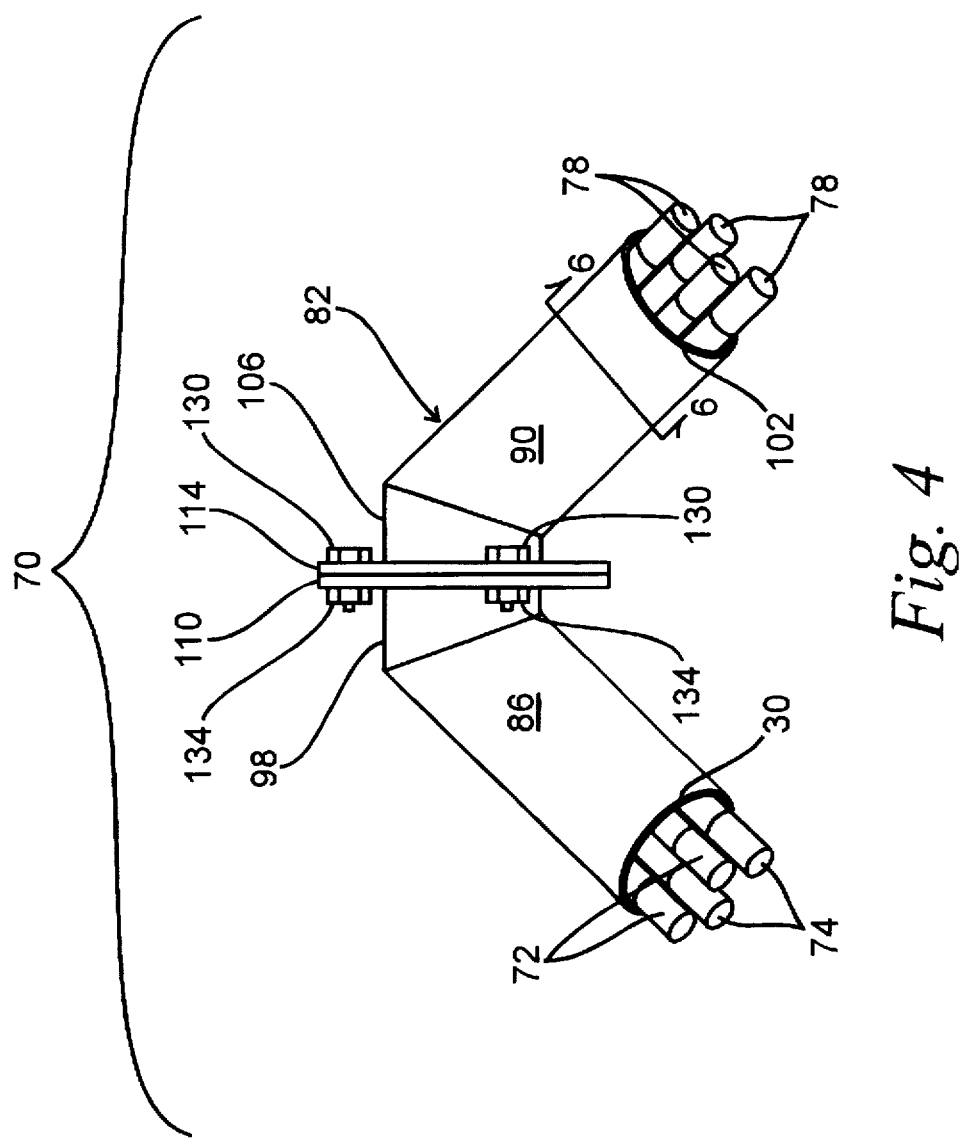
FIG. 4 is an isometric view of an alternate construction of a pre-bussed conduit elbow of the present invention.

FIG. 4 illustrates a second embodiment of the elbow generally indicated by the reference numeral 70. As in the first embodiment, a number of electrical conductors 72, each having a first end 74 and a second end 78 are formed such that a predetermined angle of 22½°, 45° or 90° is maintained between the first and second ends, 74 and 78 respectively. The conductors 72 are enclosed within a housing 82. The housing 82 is generally circular in cross-section and is made from a first tubular section 86 and a second tubular section 90.

Figure 5:
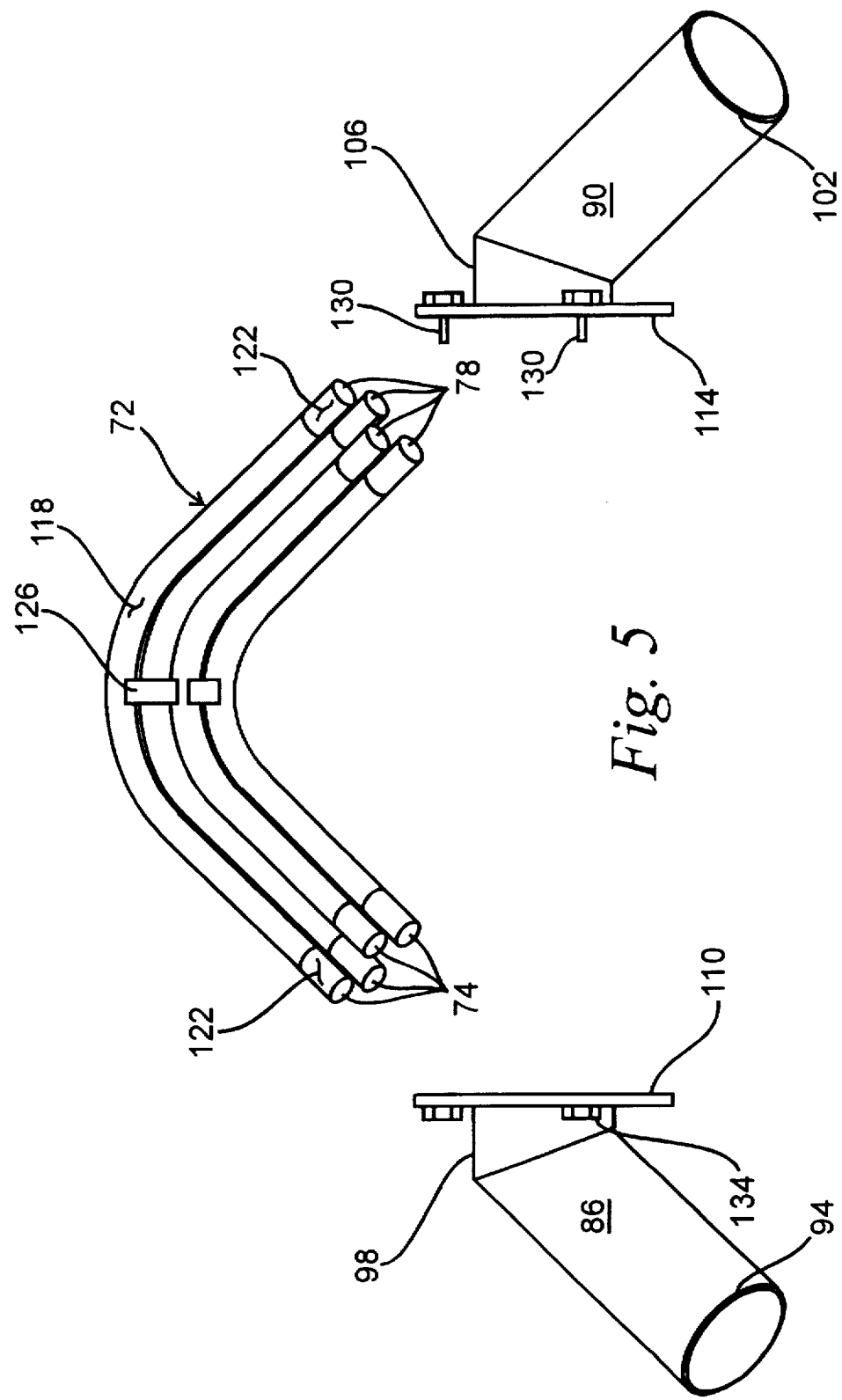
FIG. 5 is an exploded view of the alternate elbow construction shown in FIG. 4.

Referring now to FIG. 5, the first section 86 has a first end 94 and a second end 98. The second section 90 also has a first end 102 and a second end 106. The second end 98 of the first section 86 has a circumferentially extending flange 110, extending outwardly from and generally perpendicular to the circular cross-section of the housing 82. The first section 86 has an angular bend near the second end 98 such that the angle formed between the first end 94 and the second end 98 is approximately equal to one half the angle formed between the first and second ends, 74 and 78 respectively, of the conductors 72. The second end 106 of the second section 90 also has a circumferentially extending flange 114, extending outwardly from and generally perpendicular to the circular cross-section of the housing 82. The second section 90 has an angular bend near the second end 106 such that the angle formed between the first end 102 and the second end 106 is approximately equal to one half the angle formed between the first and second ends, 74 and 78 respectively, of the conductors 72. When the two flanges 110 and 114 are placed together the angle formed between the first ends 94 and 102 of the first and second sections, 86 and 90 respectively, is equal to the angle formed between the first and second ends, 74 and 78 respectively, of the conductors 72 which are enclosed. Each conductor 72 is covered by an electrically insulating sheath 118. A portion of the sheath 118 is removed from each of the first and second ends, 74 and 78 respectively, of each conductor 72 thereby exposing an electrical contact surface 122. During assembly of the elbow 72 an assembly spacer 126 is placed between the conductors 72 to maintain proper spacing. The first ends 74 of conductors 72 are inserted through the second end 98 of the first section 86 such that they extend outwardly an equal distance from the first end 94 exposing the contact surface 122. The second ends 78 of conductors 72 are inserted through the second end 106 of the second section 90 such that they extend outwardly an equal distance from the first end 102 exposing the contact surface 122. The flanges 110 and 114 of second ends 98 and 106 of the first and second sections, 86 and 90 respectively, are connected together by a suitable fastening means such as screws 130 which pass through holes in the flanges 110 and 114 and are secured by nuts 134.

Figure 6:
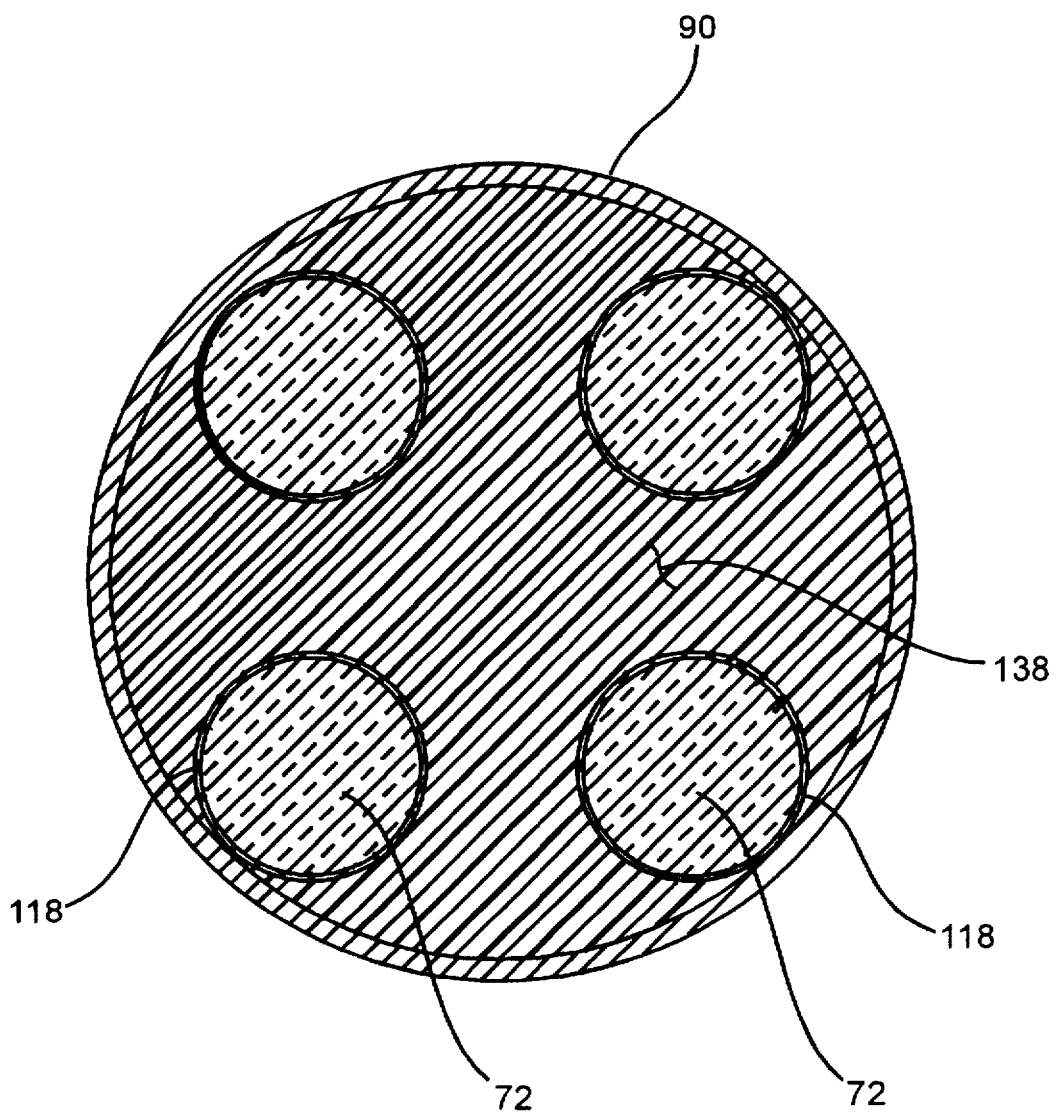
FIG. 6 is a cross-sectional view taken along lines 6—6 of FIG. 4.

Referring to FIG. 6, after assembly of the first and second sections, 86 and 90 respectively, is completed an expandable foam material 138 such as polyurethane foam is injected into the housing 70. As shown in FIG. 6, the foam material 138 expands to completely fill the housing 82 and thereby provides a continuous and uniform support for the conductors 72.

It should be noted that in all of the embodiments described above the predetermined angle may be any angle selected by the manufacturer and the housing may be made from an electrically conductive material such that it will carry the system ground current.

We claim:

1. An elbow for changing the run direction of an electrical distribution system, said elbow comprising:

a) a plurality of electrical conductors, each said conductor having a first end and a second end, said conductors being formed such that a predetermined angle is maintained between said first and second ends;

b) a housing having a first end and a second end and defining a hollow interior for receiving a significant portion of said electrical conductors, said housing being formed such that said predetermined angle is maintained between said first and second ends of said housing;

c) a plurality of retaining washers for retaining said conductors in fixed relationship to said housing during assembly of said elbow; and d) means for continuously and uniformly supporting said significant portion of each said conductor which is enclosed within said housing.

2. The elbow of claim 1 wherein each said electrical conductor is covered by an electrically insulating sheath.

3. The elbow of claim 2 wherein a portion of said sheath is removed from each of said first and second ends of each said conductor thereby providing an electrical contact surface for making an electrical connection with an adjoining electrical conductor.

4. The elbow of claim 3 wherein said first and second ends of said electrical conductors including said contact surfaces extend beyond said first and second ends of said housing.

5. The elbow of claim 1 wherein said housing is made from two sections.

6. The elbow of claim 5 wherein each said housing section further includes a plurality of conductor supports, each said support integrally formed from a portion of said housing section.

7. The elbow of claim 5 wherein each said housing section further includes a plurality of towers, each said tower integrally formed from a portion of said housing section.

8. The elbow of claim 7 wherein one of said retaining washers is pushed onto each said tower for securing said electrical conductors immediately adjacent said tower securely to said housing section.

9. The elbow of claim 5 wherein said housing sections are securely fastened together by a plurality of screws.

10. The elbow of claim 1 wherein said means for continuously and uniformly supporting said conductors is provided by an expandable foam injected into said housing.

11. An elbow for changing the run direction of an electrical distribution system, said elbow comprising:

a) a plurality of electrical conductors, each said conductor having a first end and a second end, said conductors being formed such that a predetermined angle is maintained between said first and second ends;

b) a plurality of sheaths, each said sheath providing individual electrical insulation for one of said electrical conductors, a portion of each said sheath being removed from said first and second ends of each said conductor for providing an electrical contact surface;

c) a housing having a first end and a second end and made from two sections, each said section formed to said predetermined angle, said housing defining a hollow interior for receiving a significant portion of said electrical conductors such that said contact surfaces of each said electrical conductor extends beyond said first and second ends of said housing;

d) a plurality of conductor supports, each said support integrally formed from a portion of said housing sections for supporting said conductors during assembly of said elbow;

e) a plurality of spacing towers, each said tower integrally formed from a portion of said housing sections and providing proper spacing between adjacent said electrical conductors during assembly of said elbow;

f) a plurality of retaining washers, each said washer pressed onto one of said towers for securing said conductors immediately adjacent to one of said towers to one of said housing sections;

g) means for securing said housing sections together, and;

h) a continuous and uniform conductor support provided by an expandable foam filling said hollow interior of said housing such that said support uniformly supports said significant portion of each said conductor which is enclosed within said housing after assembly of said elbow.

12. An elbow for changing the run direction of an electrical distribution system, said elbow comprising:

a) a plurality of electrical conductors, each said conductor having a first end and a second end and being formed such that a predetermined angle is maintained between said first and second ends;

b) a plurality of sheaths, each said sheath providing individual electrical insulation for one of said electrical conductors, a portion of each said sheath being removed from said first and second ends of each said conductor for providing an electrical contact surface;

c) an assembly spacer for maintaining proper spacing between said electrical conductors during assembly of said elbow;

d) a housing having a first section and a second section, each said section having a first end and a second end and each said section being formed such that an angle between said first and second ends of said sections is one half of said predetermined angle, said housing defining a hollow interior for receiving a significant portion of said electrical conductors such that said contact surfaces of each said electrical conductor extends beyond said first and second ends of said housing;

e) means for securing said first and second housing sections together;

f) a continuous and uniform conductor support provided by an expandable foam filling said hollow interior of said housing such that said support uniformly supports said significant portion of each said conductor which is enclosed within said housing after assembly of said elbow.

* * * * *